Patented Apr. 11, 1944

2,346,136

UNITED STATES PATENT OFFICE

2,346,136

PLASTIC COMPOSITION AND PROCESS OF MAKING THE SAME

Stanley P. Lovell, Newtonville, and Harry H. Straw, Boston, Mass., assignors to Beckwith Manufacturing Company, Dover, N. H., a corporation of New Hampshire No Drawing. Application October 17, 1941, Serial No. 415,486

8 Claims. (Cl. 106—191)

The present invention consists in a new plastic composition of matter or a new material of which the essential ingredients are ethyl-cellulose, a natural thermoplastic wax and a hardening ingredient. The invention includes within its scope the novel process herein disclosed for preparing such material.

The purpose of our invention is to produce a plastic composition adaptable to be molded accurately under heat and pressure in present equipment and machinery, and having many of the qualities of die-casting or type metal. Heretofore plastics or synthetic resins, either of the thermo-setting type, such as phenol-formaldehyde condensation products, or thermoplastic resins, such as n-butyl-methacrylate, have been of limited utility in displacing the lighter metals. This has been partly due to their persistent tendency to cold flow under pressure, to lack of a flow point when heated, and to their unsuitable coefficient of expansion and contraction. Thus, in die-casting they lack utility as a metal substitute, since their viscosity at the highest practicable temperatures makes them difficult to inject into a mold, and they have generally been found to cleave to the mold upon cooling, to bind in it, and otherwise to defeat easy and quick discharge from the mold.

After extended research we have discovered a combination of ethyl cellulose and natural wax in roughly equal parts which, when combined in a novel manner as later described, overcomes the objections above discussed. In accordance with our invention we first melt a natural thermoplastic wax, such as candelilla wax, which is the outer incrustation of the shrub *Euphorbia antisyphillitica* found in great abundance in the northern provinces of Mexico.

To the molten candelilla wax maintained at a temperature of 250° to 300° F. we add sodium carbonate and thereby induce a frothing reaction due in part to release of $CO_2$ and probably effecting a partial saponification of the fatty acids of the wax. About 26% of candelilla wax is saponifiable acid. While the reaction is not fully understood it is probable that its result is to link the metal of the $Na_2CO_3$ to the acid of the wax, forming a metal soap which later acts as a plasticizer for ethyl cellulose in conjunction with the unsaponifiable portion of the candelilla wax, or it may be that $Na_2CO_3$ replaces in the candelilla wax some of an original alkaline substance which may have been removed in reducing the natural wax to a commercial product. As the frothing reaction continues the candelilla wax darkens, becoming dark brown in color. The amount of $Na_2CO_3$ added at this stage of the process should be about 1½% of the weight of the candelilla wax ingredient.

At the conclusion of the frothing reaction, when no further change in color or texture is observable, the molten mixture is brought up to about 400° F. and ethyl cellulose in granular form is gradually added and stirred into the mix in an amount in desired proportion to the mass of carbonated candelilla wax. The ethyl cellulose rapidly dissolves and disperses in the mixture which now becomes smooth, homogeneous and exhibits a relatively low viscosity, at this elevated temperature.

If desired, at this stage a filler, such as wood flour, cotton flock or carbon black, may be introduced in an amount of 5 to 10%. This is stirred into the molten mixture increasing the bulk of the material and increasing its viscosity so that when subsequently molded it will give more back pressure in the mold.

The molten mixture is held at about 400° F. until it becomes entirely smooth and homogeneous whereupon it may be cooled and hardened in sheet form. Preferably it is poured from the kettle upon rolls where it is worked and finally discharged in the form of a sheet about ¼" in thickness. When it has cooled it may be ground or comminuted into coarse granules suitable for use in die-casting machinery. The granular material produced by the above-disclosed process and formulation is an intermediate product in the sense that it must be subject to further heating and pressure to convert it to mechanically useful form. It is, however, stable, easily transported and easily employed in standard equipment where metal has formerly been used.

The die-casting operation may subsequently be carried out in any usual or well known manner. The granular material produced as above explained is poured into the hopper of the die-casting machine or injection molder and from there passed to a heated duct where it is brought to a temperature of about 340° F. It is thus reduced to a syrupy viscous liquid and may be forced under pressure of 200 to 700 lbs. per square inch into the cool molds. The molten material sets almost instantly in the mold and after a suitable interval the molded article may be removed while still warm. As it cools out of the mold, it hardens to a striking degree. The resulting material is dense, hard, tough and resilient, having a specific gravity of about 0.90 and a water absorption factor of less than 1% after prolonged immersion. It releases itself readily from the mold, has little or no cold flow, a tensile strength of about 4,000 lbs. per square inch and breaks with a clean fracture. The material may be produced in practically any desired color by the addition of a pigment with the filler, or by employing a pigment filler, for example, if carbon black is used, the resulting material is black in color.

The ability of our compound to take and retain a faithful definition and shape comparable to that heretofore achieved by metals allows its use in a wide field of endeavor. For example, we have successfully made half-tone impressions of 200-inch screen fineness, also printing plates employing the finest type. Again, our new compound is highly dielectric and is thus suitable for casings for magnetic and electrical instruments, gyroscopes and the like.

In the best form now known to us the material of our invention comprises the ingredients set forth in the following formula:

| | Per cent |
|---|---|
| Ethyl cellulose | 53 |
| Carbonated candelilla wax | 42 |
| Wood flour or cotton flock | 5 |

As already explained the carbonated or saponified candelilla wax is formed by adding about 1½% $Na_2CO_3$ to the candelilla wax ingredient entering into the formula. The specific formula disclosed is, of course, merely that which we prefer to use and may be varied to suit current requirements of industry, all within scope of our invention so long as it includes as its principal ingredients ethyl cellulose, or its equivalent, and an alkali-treated natural wax.

While we prefer to use candelilla wax in producing the material of our invention, montan wax, carnauba wax, shellac wax, cane wax or uricury wax may be substituted. Potassium carbonate, calcium carbonate, potassium hydroxide or other alkalis, preferably containing some water of crystallization may be substituted for $Na_2CO_3$, the preferred reagent, all within the scope of our invention.

It is our theory that candelilla wax and ethylcellulose, both being chemically non-saturated compounds, become closed or saturated and are thus chemically converted by our process into a new material.

The hardening ingredient employed in compounding our new material may be varied, depending upon the results desired, but for ordinary work we prefer sodium carbonate in the form of dry crystals, and we believe it forms a linked chain structure in our process. We believe that the great wealth of prior experimentation in this field of plastics has heretofore failed to make use of all the combinations, physical and chemical, inherently possible by the available natural thermoplastics, of which candelilla wax is an outstanding example, and truly thermoplastic synthetic products, of which ethyl-cellulose is typical; and further, that our compound as disclosed herein may be produced at a cost comparable to metals, and thus much cheaper than plastics formerly offered; that it requires no special machinery for its use and thus economically reduces investment and overhead; and finally, that the articles made from it have longer service and usefulness than those formerly shaped from metal.

Having thus disclosed our invention and described in detail the new composition of matter resulting from the practice of our novel process in the best form now known to us, we claim as new and desire to secure by Letters Patent:

1. A new composition of matter suitable for die-casting and comprising a solid solution of substantially 53% ethyl cellulose and 47% consisting of candelilla wax combined with sodium carbonate in a ratio of 100 to 1½.

2. A new composition of matter suitable for casting as a metal and comprising a solid solution of approximately 53% ethyl cellulose, 42% consisting of candelilla wax combined with sodium carbonate in a ratio of 100 to 1½, and 5% filler.

3. A new composition of matter suitable for die-casting having a specific gravity of approximately 0.9 and a water absorbing factor of not over 1% and comprising ethyl cellulose in solid solution in roughly equal parts with a partially saponified natural wax selected from the group consisting of carnauba, montan and candelilla wax.

4. A new composition of matter suitable for casting and comprising ethyl cellulose in solid solution in roughly equal parts with a natural wax selected from the group consisting of carnauba, montan and candelilla wax, combined with an alkali selected from the group consisting of $Na_2CO_3$, $K_2CO_3$, $NaOH$, $KOH$, $CaCO_3$.

5. The process of making die-casting material, which consists in heating molten candelilla wax and sodium carbonate until a frothing reaction is induced, and after the reaction has subsided adding roughly an equal weight of ethyl cellulose in granular form and thereby producing a smooth, homogeneous molten mixture, cooling and hardening said mixture and comminuting the resulting material.

6. The process of making a plastic composition, which consists in heating a molten natural wax selected from the group consisting of carnauba, montan and candelilla wax with a mild alkali thereby inducing a frothing reaction, then adding ethyl cellulose in a quantity at least equal to that of the mixture, adding 5-10% of a filling material to increase the viscosity of the mixture, milling and reducing the mixture to sheet form and comminuting it.

7. The process of making a plastic composition, which consists in heating molten candelilla wax with sodium carbonate in an amount equal to about 1½% of the weight of said wax thereby inducing a frothing and darkening reaction in the molten mixture, to approximately 42 parts of this molten solution adding about 53 parts of ethyl cellulose and then about 5 parts of wood flour, cooling and reducing the composite solution to sheet form and then comminuting the resulting material.

8. A new composition of matter, having as its principal ingredient ethyl cellulose in solid solution in roughly equal parts with partially saponified candelilla wax, and constituting a hard, tough, resilient material having a specific gravity of about 0.9 and a tensile strength of about 4,000 lbs. per square inch.

STANLEY P. LOVELL.
HARRY H. STRAW.